(12) United States Patent
Horiuchi et al.

(10) Patent No.: US 11,218,035 B2
(45) Date of Patent: Jan. 4, 2022

(54) ARMATURE STRUCTURE OF THREE-PHASE MOTOR

(71) Applicant: SANYO DENKI CO., LTD., Tokyo (JP)

(72) Inventors: Manabu Horiuchi, Tokyo (JP); Hiroki Sagara, Tokyo (JP); Jun Kitajima, Tokyo (JP); Mai Shimizu, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 111 days.

(21) Appl. No.: 16/719,295

(22) Filed: Dec. 18, 2019

(65) Prior Publication Data

US 2020/0204015 A1 Jun. 25, 2020

(30) Foreign Application Priority Data

Dec. 25, 2018 (JP) .............................. JP2018-240710

(51) Int. Cl.
*H02K 1/14* (2006.01)
*H02K 3/20* (2006.01)
*H02K 3/52* (2006.01)
*H02K 29/03* (2006.01)

(52) U.S. Cl.
CPC ............... *H02K 1/146* (2013.01); *H02K 1/14* (2013.01); *H02K 3/20* (2013.01); *H02K 3/522* (2013.01);
(Continued)

(58) Field of Classification Search
CPC .......... H02K 1/146; H02K 3/522; H02K 3/20; H02K 29/03; H02K 1/148; H02K 3/345;
(Continued)

(56) References Cited

U.S. PATENT DOCUMENTS

| 4,633,114 A | 12/1986 | Reynolds |
| 5,418,416 A * | 5/1995 | Muller .................. H02K 1/146 |
| | | 310/186 |

(Continued)

FOREIGN PATENT DOCUMENTS

| EP | 1261102 A2 | 11/2002 |
| EP | 1261102 A3 | 1/2003 |

(Continued)

OTHER PUBLICATIONS

Ume et al, Stator Core and Manufacturing Method, May 16, 2019, Aisin Seiki Kabushiki Kaisha, WO 2019093205 (English Machine Translation) (Year: 2019).*

(Continued)

*Primary Examiner* — Quyen P Leung
*Assistant Examiner* — Alexander A Singh
(74) *Attorney, Agent, or Firm* — Rankin, Hill & Clark LLP

(57) ABSTRACT

Provided is an armature structure of a three-phase motor which includes: 6N (N is a natural number) slots; 3N coils per phase; 3N main poles; and 3N auxiliary poles. In the armature structure of a three-phase motor, a coil wound around a winding bobbin inserted into the slot is wound around the main pole, the coil is not wound around the auxiliary pole, the main poles and the auxiliary poles are alternately placed, the winding bobbin includes a barrel portion and a flange portion, the barrel portion is in contact with a side surface in a circumferential direction of the main pole in the slot, the flange portion rises in the slot from the barrel portion along a first outer peripheral bottom portion of the slot, a side surface in the circumferential direction of the auxiliary pole, an outer peripheral surface of the coil, and a second outer peripheral bottom portion of the slot define a gap area that is not occupied by the coil, in the slot, and the
(Continued)

second outer peripheral bottom portion is continuous to the first outer peripheral bottom portion, and extends in a direction intersecting the first outer peripheral bottom portion.

4 Claims, 4 Drawing Sheets

(52) U.S. Cl.
 CPC ......... *H02K 29/03* (2013.01); *H02K 2203/12* (2013.01)

(58) Field of Classification Search
 CPC .......... H02K 3/18; H02K 1/165; H02K 3/527; H02K 3/28; H02K 1/12; H02K 1/14; H02K 1/141; H02K 1/143; H02K 1/145; H02K 1/16; H02K 1/00; H02K 1/02; H02K 1/04; H02K 1/06; H02K 1/08; H02K 3/02; H02K 3/12; H02K 2203/12
 USPC ........... 310/179, 216.001, 216.004, 216.012, 310/216.022, 216.051, 216.057, 216.074, 310/216.115, 433, 216.064
 See application file for complete search history.

(56) References Cited

U.S. PATENT DOCUMENTS

| | | | | |
|---|---|---|---|---|
| 6,483,221 | B1 * | 11/2002 | Pawellek | ............... H02K 1/148 310/216.064 |
| 2002/0175587 | A1 | 11/2002 | Vollmer | |
| 2004/0021393 | A1 * | 2/2004 | Suzuki | ................... H02K 1/185 310/216.012 |
| 2009/0108699 | A1 | 4/2009 | Li et al. | |
| 2009/0127971 | A1 | 5/2009 | Ishizeki et al. | |
| 2009/0127972 | A1 | 5/2009 | Ishida | |
| 2015/0222150 | A1 | 8/2015 | Makita et al. | |
| 2017/0324285 | A1 | 11/2017 | Brohm et al. | |
| 2018/0166932 | A1 * | 6/2018 | Desai | ....................... H02K 3/28 |

FOREIGN PATENT DOCUMENTS

| | | | |
|---|---|---|---|
| JP | 52-36704 | A1 | 3/1977 |
| JP | 53-5709 | A1 | 1/1978 |
| JP | 53-43807 | A | 4/1978 |
| JP | H11234990 | A | 8/1999 |
| JP | 2010-57277 | A | 3/2010 |
| JP | 5253789 | B2 | 7/2013 |
| JP | 2016-167907 | A1 | 9/2016 |
| WO | WO-2019093205 | A1 * | 5/2019 ............. H02K 1/148 |

OTHER PUBLICATIONS

Japanese Office Action (JPOA) dated Nov. 26, 2019 issued in the corresponding Japanese Patent Application No. 2018-240710.
Extended European Search Report (EESR) dated May 7, 2020 for the corresponding European Patent Application No. 19218199.8.

* cited by examiner

ARMATURE STRUCTURE OF THREE-PHASE MOTOR

CROSS-REFERENCE TO RELATED APPLICATION

This application is based on Japanese Patent Application No. 2018-240710 filed with the Japan Patent Office on Dec. 25, 2018, the entire content of which is hereby incorporated by reference.

BACKGROUND

1. Technical Field

The present disclosure relates to an armature structure of a three-phase motor.

2. Related Art

In a three-phase synchronous motor including a permanent magnet, the structure of a three-phase motor including 6N (N: a natural number) slots and 3N coils per phase is conventionally presented as illustrated in, for example, JP-A-11-234990 (Patent Document 1).

Moreover, in Japanese Patent No. 5253789 (Patent Document 2), unwound auxiliary poles are inclined from the middle in such a manner as to be parallel to a main pole to allow provided shoulder portions to ensure a space of a hole.

SUMMARY

An armature structure of a three-phase motor according to an embodiment of the present disclosure includes: 6N (N is a natural number) slots; 3N coils per phase; 3N main poles; and 3N auxiliary poles. In the armature structure of a three-phase motor, a coil wound around a winding bobbin inserted into the slot is wound around the main pole, the coil is not wound around the auxiliary pole, the main poles and the auxiliary poles are alternately placed, the winding bobbin includes a barrel portion and a flange portion, the barrel portion is in contact with a side surface in a circumferential direction of the main pole in the slot, the flange portion rises in the slot from the barrel portion along a first outer peripheral bottom portion of the slot, a side surface in the circumferential direction of the auxiliary pole, an outer peripheral surface of the coil, and a second outer peripheral bottom portion of the slot define a gap area that is not occupied by the coil, in the slot, and the second outer peripheral bottom portion is continuous to the first outer peripheral bottom portion, and extends in a direction intersecting the first outer peripheral bottom portion.

BRIEF DESCRIPTION OF DRAWINGS

FIG. 1A is a cross-sectional view illustrating a cross-sectional structure of an iron core and coils as viewed in an axial direction, and FIG. 1B is a cross-sectional view taken along line Ia-Ib of FIG. 1A;

DETAILED DESCRIPTION

Figure 1A:
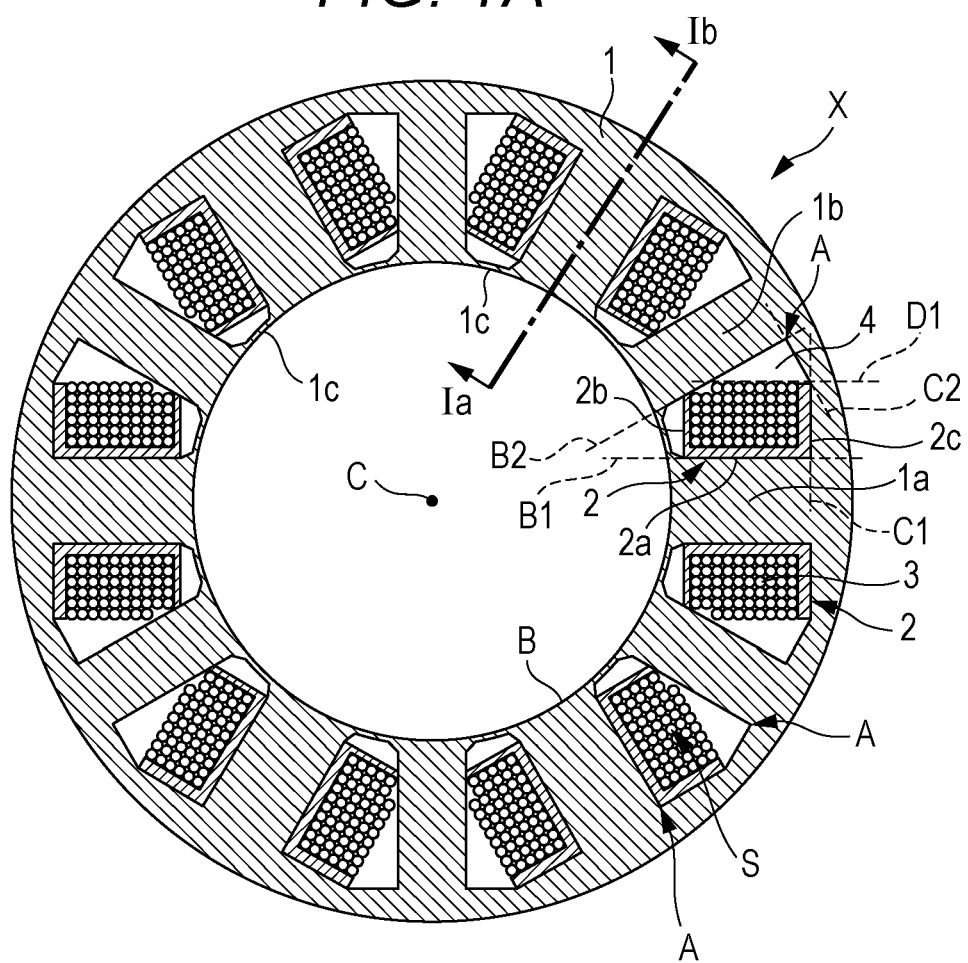
FIGS. 1A and 1B are cross-sectional views illustrating an armature structure of a three-phase synchronous motor according to one embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to the structure described in Patent Document 1, in terms of the shape of a coil, a wire is wound along an arc-shaped slot bottom portion. In other words, a wire is not wound in such a manner that the auxiliary pole and the winding become parallel to each other.

Therefore, the winding space is not effectively used. Accordingly, the winding fill factor reduces. As a result, the contribution of the winding to an improvement in the performance of the motor is small.

Moreover, according to Patent Document 2, the winding is packed without gap in the slot. Hence, although the winding fill factor is high, a passage for resin molding is not ensured. As a result, the filling performance of resin cannot be improved. Moreover, if a wire is wound sufficiently to till the gap, an increase in torque is not achieved. Furthermore, the winding is humped in the axial direction, which leads to a problem that the entire length of the motor is increased.

An object of the present disclosure is to solve the above problems.

According to an aspect of the present disclosure, there is provided is an armature structure of a three-phase motor which includes: 6N (N is a natural number) slots; 3N coils per phase; 3N main poles; and 3N auxiliary poles. In the armature structure of a three-phase motor, a coil wound around a winding bobbin inserted into the slot is wound around the main pole, the coil is not wound around the auxiliary pole, the main poles and the auxiliary poles are alternately placed, the winding bobbin includes a barrel portion and a flange portion, the barrel portion is in contact with a side surface in a circumferential direction of the main pole in the slot, the flange portion rises in the slot from the barrel portion along a first outer peripheral bottom portion of the slot, a side surface in the circumferential direction of the auxiliary pole, an outer peripheral surface of the coil, and a second outer peripheral bottom portion of the slot define a gap area that is not occupied by the coil, in the slot, and the second outer peripheral bottom portion is continuous to the first outer peripheral bottom portion, and extends in a direction intersecting the first outer peripheral bottom portion.

According to the above-mentioned armature structure of the three-phase motor, in resin molding, a gap created between the coil and the auxiliary pole forms a passage where molding resin passes. The resin can reach an opposite coil end through the passage. Hence, the resin filling properties can be increased.

Preferably, at least a core sheet located at an end in an axial direction includes coupling portions at an end portion on an inner peripheral side of core sheets of the main poles and the auxiliary poles.

It is preferred that lengths of arcs of the magnetic pole distal end portions located on the inner peripheral surfaces of the main pole and the auxiliary pole are formed into arc shapes forming parts of a circumference of a concentric circle with a circumferential length at a predetermined ratio to a circumferential length of an outer circle of an iron core, one of the main pole and the auxiliary pole includes, in the magnetic pole distal end portion, a flange-shaped portion extending to both sides on the circumference of the concentric circle, and the length of the arc of the magnetic pole distal end portion of the other of the main pole and the auxiliary pole is less than a width in the circumferential direction of a portion, other than the magnetic pole distal end portion, of the other of the main pole and the auxiliary pole, in accordance with the length of the arc of the flange-shaped portion.

If the main pole where the magnetomotive force of the coil is concentrated and the auxiliary pole are distinguished, a distal end of at least one of the main pole and the auxiliary pole is narrower than the magnetic pole. Accordingly, it is possible to effectively prevent a leakage flux.

According to the present disclosure, it is possible to increase the winding fill factor in the three-phase motor. Moreover, it is possible to prevent an increase in the temperature of the winding.

Moreover, the ensured gap can reduce the protuberance of the winding in the axial direction to a minimum and reduce the entire length of the motor.

Furthermore, the coil end does not contribute to the torque of the motor. Hence, not to wind the wire in the gap has no adverse effects on the torque. In other words, it is possible to increase the torque and reduce the cogging torque.

In the specification, the bobbin indicates a tube having an electrical wire that is wound around the tube and forms a coil. The bobbin can be made of an insulating material. Moreover, the empty bobbin is a bobbin without an electrical wire that is wound around the bobbin.

Moreover, a periphery closer to a rotation axis C in a radial direction with respect to the rotation axis C is referred to as the inner periphery. A periphery farther from the rotation axis C is referred to as the outer periphery. A direction along the rotation axis is referred to as the rotation axis direction. A direction extending radially with the rotation axis as the center is referred to as the radial direction. Moreover, a direction rotating about the rotation axis is referred to as the circumferential direction. A side closer to the rotation axis with the rotation axis as the center is referred to as the inner peripheral side. A side farther from the rotation axis is referred to as the outer peripheral side. A periphery on an inner diameter side is referred to as the inner periphery. A periphery on an outer diameter side is referred to as the outer periphery. A positional relationship is described below with reference to the rotation axis C of the motor.

An armature structure of a three-phase synchronous motor including a permanent magnet according to one embodiment of the present disclosure is described in detail hereinafter with reference to the drawings.

In a rotary machine, an increase in winding fill factor and the molding of a winding with resin such as cast molding or injection molding lead to a reduction in the temperature of the armature and then to an increase in output. Hence, thermal design is a very important point.

First Embodiment

Figure 1B:
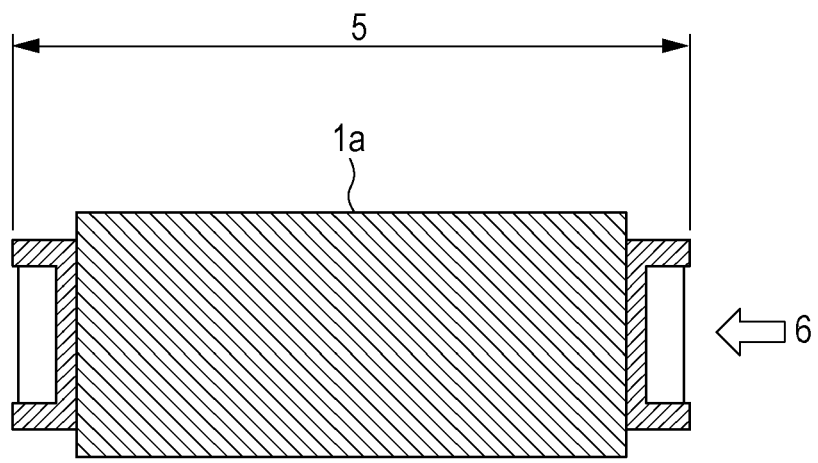

FIGS. 1A and 1B are cross-sectional views illustrating an armature structure X of a three-phase synchronous motor according to the embodiment. FIG. 1A is a cross-sectional view illustrating a cross-sectional structure of an iron core and coils as viewed in the axial direction. FIG. 1B is a cross-sectional view illustrating a cross-sectional structure of the iron core in the radial direction taken along line Ia-Ib. The armature of the motor is, for example, a cylindrical armature where a roto mover that rotates on the inner peripheral side is placed.

As illustrated in FIG. 1A, in the armature structure X of the three-phase motor, an iron core 1 includes 6N (N is a natural number) slots. On the other hand, the armature structure X includes 3N coils. The number of coils is half the number of slots. For example, the coils and the slots are alternately placed.

The iron core 1 is divided into main poles 1a and auxiliary poles 1b. A coil 3 is wound around the main pole 1a. In other words, the coil 3 is wound around a bobbin (winding bobbin) 2 inserted into a slot S adjacent to the main pole 1a. In contrast, the coil 3 is not wound around the auxiliary pole 1b. Root portions (end portions on the outer diameter side) A of the main pole 1a and the auxiliary pole 1b, a line (a virtual line the same hereinafter) C1 (a first virtual line) perpendicular to a side surface B1 of the main pole 1a, and a line C2 (a second virtual line) perpendicular to the auxiliary pole 1b define an outer peripheral shape of a bottom portion of the slot S (a bottom portion). FIG. 1A illustrates a structure including distal end portions on the inner peripheral side of the magnetic poles adjacent along the circumferential direction of the rotation axis, the distal end portions being coupled to each other.

A more specific description is given. The bobbin 2 includes a barrel portion 2a that is in contact with the main pole 1a in the slot S, and a flange portion 2b on the inner peripheral side and a flange portion 2c on the outer peripheral side in the slot S, the flange portions 2b and 2c rising from the barrel portion 2a along a first outer peripheral bottom portion (a bottom surface along C1) of the slot S. The barrel portion 2a is placed along the line B1. The flange portion 2c on the outer peripheral side is placed along the line C1. In other words, in terms of the shape of the bobbin 2 in the slot S, the flange portion 2c on the ouster peripheral side faces in the circumferential direction, and is provided substantially perpendicularly to the barrel portion 2a.

Furthermore, a second outer peripheral bottom portion (a bottom surface along C2) continuous to the first outer peripheral bottom portion of the slot S is formed in the slot S. The second outer peripheral bottom portion extends in a direction intersecting the first outer peripheral bottom portion.

A gap area 4 that is not occupied by the coil 3 is formed in the slot S. The gap area 4 is defined by a side surface in the circumferential direction (a side surface along a line B2) of the auxiliary pole 1b, an outer peripheral side surface (a side surface along a line D1) of the coil 3 wound around the bobbin 2, and the second outer peripheral bottom portion (the bottom surface along C2).

The above configuration is described taking the cross-sectional structure of FIG. 1A as an example. With the above configuration of the bobbin 2, the line D1 parallel to the line B1 along the outer periphery of the coil, the line B2, and the line C2 form angles intersecting with each other in the area surrounded by the line D1, the line B2, and the line C2. Hence, the gap area 4 is formed between the coil 3 and the auxiliary pole 1b.

Preferably, the auxiliary pole 1b and the opposing outer peripheral surface of the coil 3 are electrically insulated. For example, an insulator may be inserted between the auxiliary pole 1b and the opposing outer peripheral surface of the coil 3. Alternatively, simply spatially isolating the auxiliary pole 1b from the outer peripheral surface of the coil 3 is also sufficient. Furthermore, a second bobbin (an unwound empty bobbin) inserted into the slot S adjacent to the auxiliary pole 1b may be provided.

Moreover, the gap area 4 in the armature structure according to the embodiment plays a role as a passage where molding resin passes in molding work such as cast molding or injection molding with varnish or resin after winding assembly. For example, if an attempt is made to fill a mold with resin in a direction of an arrow 6 in FIG. 1B through a gate provided as an inlet for pouring resin into a molding during the molding work, it is possible to pass the resin to the opposite coil end through the appropriate gap area 4 formed between the coil 3 according to the embodiment and the auxiliary pole 1b. Consequently, the filling property of resin can be increased. Generally, the filling process can also be performed by forming a hole. However, the armature structure according to the embodiment is different from the normal filling process in the respect that the resin is in direct contact with the winding. Hence, an advantage that the heat of the winding can be efficiently dissipated is obtained.

Moreover, as illustrated in FIG. 1B, the length of the coil end is reduced to allow making an entire length 5 of the motor short.

Furthermore, the ensured gap area 4 can reduce the protuberance of the coil 3 in the axial direction to a minimum. Hence, the entire length of the motor can be reduced. In other words, the structure is not particularly limited. Coil layers wound around the main pole 1a are fewer in the armature structure of the synchronous motor according to the embodiment than in a structure where the coil 3 is wound up to the portion of the gap area 4. Hence, a reduction in the length of the coil allows reducing the entire length 5 of the motor.

Moreover, the coil end does not contribute to the torque of the motor. Hence, not to wind the wire in the gap has no adverse effects on the torque. In other words, according to the embodiment, it is possible to increase the torque and reduce the cogging torque.

The iron core 1 is formed by, for example, laminated core sheets.

In other words, the laminated core sheets may include coupling portions 1c that couple distal end portions on the inner peripheral side of magnetic poles adjacent in the circumferential direction of the rotation axis (a first configuration). Moreover, the laminated core sheets may include non-coupling portions 1d that separate the distal end portions on the inner peripheral side of the magnetic poles adjacent in the circumferential direction of the rotation axis (a second configuration).

Alternatively, core sheets with the first configuration and core sheets with the second configuration, which have been aligned in such a manner that the coupling portion 1c and the non-coupling portion 1d coincide with each other, may be laminated to form an iron core (a third configuration).

Preferably, at least a core sheet located at an end portion in the axial direction among core sheets of the main poles 1a and the auxiliary poles 1b includes the coupling portions.

Figure 1C:
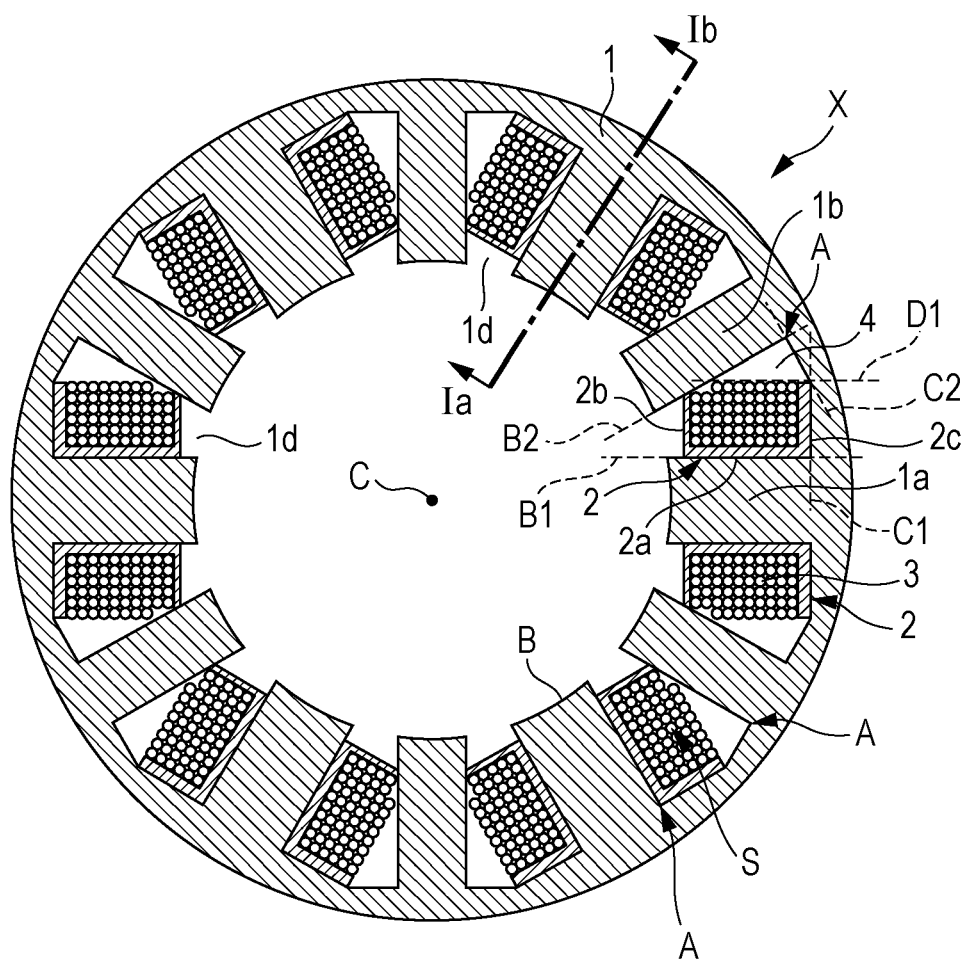
FIG. 1C is a diagram illustrating a modification of FIG. 1A.

FIG. 1C is a diagram illustrating a modification of FIG. 1A. A difference between FIGS. 1C and 1A is in that in FIG. 1A the main pole 1a and the auxiliary pole 1b are connected on the inner peripheral side of the iron core 1 while in FIG. 1C the main pole 1a and the auxiliary pole 1b are not coupled and are separated on the inner peripheral side of the iron core 1. In other words, FIG. 1C illustrates a structure including the distal end portions on the inner peripheral side of the magnetic poles adjacent in the circumferential direction of the rotation axis, the distal end portions being separated from each other.

All of the configuration where the distal end portions on the inner peripheral side of the magnetic poles of the iron core 1 are connected (coupled) (the first configuration), the configuration where the distal end portions on the inner peripheral side of the magnetic poles of the iron core 1 are separated (are not coupled) (the second configuration), and the configuration including the first and second configurations (the third configuration) can be applied to the armature structure of the present disclosure. On the other hand, the armature structure of the present disclosure is not limited to any of the first to third configurations.

According to the embodiment, the winding fill factor can be increased in a three-phase motor. Moreover, an increase in the temperature of the winding can be prevented.

Moreover, the ensured gap can reduce the protuberance of the winding in the axial direction to a minimum, and reduce the entire length of the motor.

Furthermore, the coil end does not contribute to the torque of the motor. Hence, not to wind the wire in the gap has no adverse effects on torque. In other words, it is possible to increase the torque and reduce the cogging torque.

Second Embodiment

In a second embodiment of the present disclosure, thought is further given not only to the shape of the root portion (the end portion on the outer diameter side) of the magnetic pole of the armature structure of the three-phase motor according to the first embodiment but also to the shape of the distal end (the end portion on the inner diameter side). Consequently, it is possible to achieve compatibility between an increase in torque and a reduction in cogging torque.

A description is given below, taking the configuration of FIG. 1C as an example. However, needless to say, the configuration of FIG. 1A can be applied to the second embodiment. In other words, any of the above first to third configurations can be used. In other words, the second embodiment does not depend on coupling or non-coupling of the distal end portions on the inner peripheral side of the iron core 1.

Figure 2:
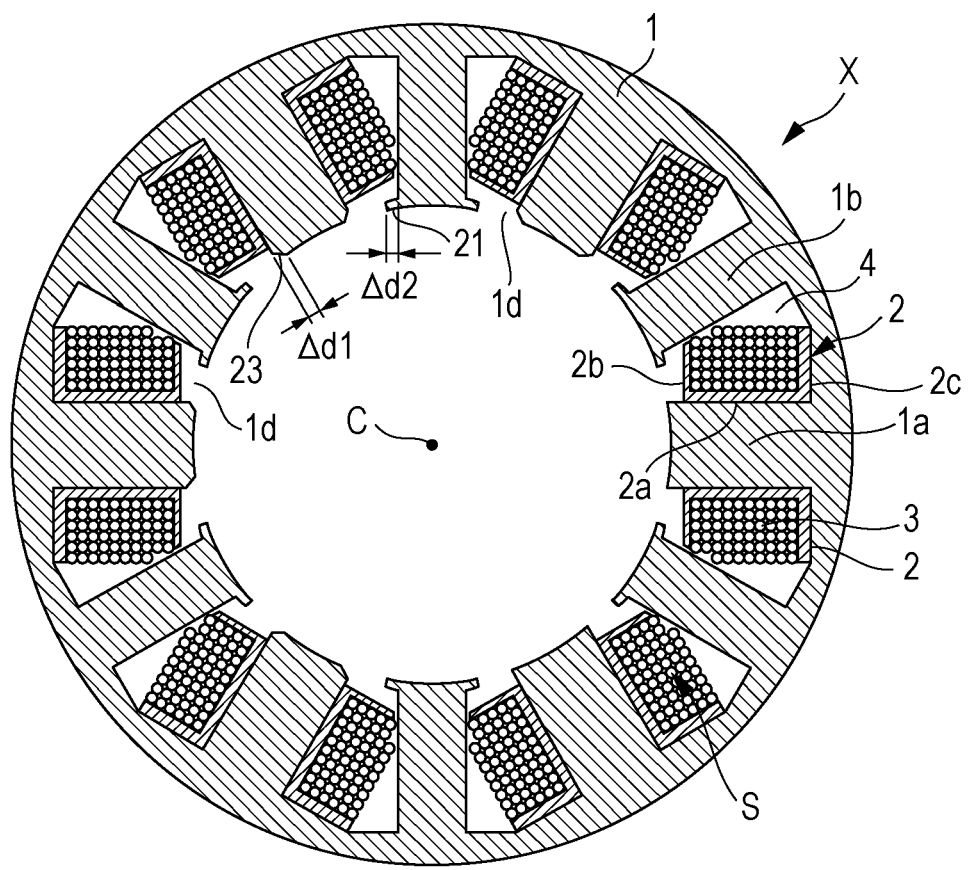
FIG. 2 is a cross-sectional view illustrating a first embodiment of an asymmetric distal end structure, the cross-sectional view corresponding to FIG. 1C.

FIG. 2 is a cross-sectional view illustrating the first embodiment having an asymmetric distal end structure. FIG. 2 is a diagram corresponding to FIG. 1C. As illustrated in FIG. 2, an armature structure X includes a main pole 1a around which a coil 3 wound around an inserted bobbin 2 is wound, and an auxiliary pole 1b around which the coil is not wound. A distal end portion on the inner peripheral side of the main pole 1a and a distal end portion on the inner peripheral side of the auxiliary pole 1b are formed into an arc shape forming a part of the circumference of a concentric circle with a circumferential length at a predetermined ratio to the circumferential length of an outer circle of the iron core. In addition, the distal end portion on the inner peripheral side of the auxiliary pole 1b has a flange-shaped portion 21 extending to the sides on the circumference of the concentric circle of the distal end portion.

The distal end portion on the inner peripheral side of the main pole 1a is formed as a tapered portion 23 that tapers to one end. In other words, the length of the arc of the distal end portion on the inner peripheral side of the main pole 1a is less than the width in the circumferential direction of a portion of the main pole 1a other than the distal end portion on the inner peripheral side, in accordance with the length of the arc of the flange-shaped portion 21 at the end of the auxiliary pole 1b. For example, a width Δd2 of the flange-shaped portion 21 in the circumferential direction may be the same as a width Δd1 of the tapered portion 23 in the circumferential direction.

In the motor, generally, the distal end of a magnetic pole is expanded as compared to the width of the magnetic pole to allow the rotor to efficiently transmit magnetic flux. As a result, a large torque can be derived. However, the distance between adjacent magnetic poles is reduced depending on the design of the cross section of an iron core. Hence, "flux leakage" where the magnetic flux of the armature is short-circuited between the magnetic poles may occur and the expansion of the magnetic pole distal end may not contribute to the torque.

In such a case, a design in a direction that reduces the expansion of the magnetic pole distal end contributes more to an increase in torque. Especially, if the main pole 1a where the magnetomotive force of the coil is concentrated, and the auxiliary pole 1b are distinguished as in the embodiment, the distal end portion on the inner peripheral side of the main pole 1a is made narrower than the other portion of the magnetic pole. Accordingly, flux leakage can be effectively prevented.

In addition, the angle of the expansion of the distal end portions on the inner peripheral side of adjacent magnetic poles determines the cogging torque. Hence, it is also possible to reduce the cogging torque with a tapered shape similar to the above shape.

In this manner, it was found that the effect of a reduction in cogging torque based on a tapered magnetic pole is excellently exerted if the dimensional ratio of the outer periphery and inner periphery of the iron core is the inner periphery/the outer periphery ≤0.55.

Figure 3:
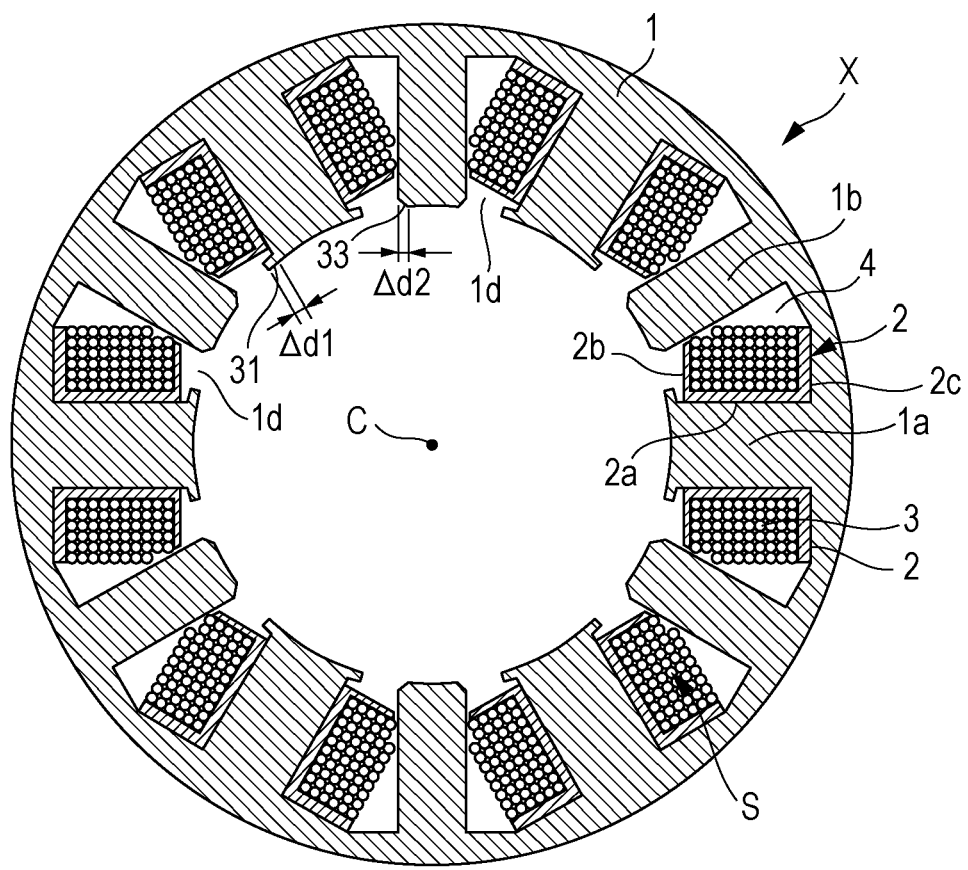
FIG. 3 is a cross-sectional view illustrating a second embodiment of the asymmetric distal end structure.

FIG. 3 is a diagram illustrating the second embodiment having another asymmetric distal end structure. Contrary to the structure of FIG. 2 as illustrated in FIG. 3, the armature structure X includes the main pole 1a around which the coil 3 wound around the inserted bobbin 2 is wound, and the auxiliary pole 1b around which the coil is not wound. The distal end portion on the inner peripheral side of the main pole 1a is formed into a flange-shaped portion 31. A tapered portion 33 may be formed in such a manner that the distal end portion on the inner peripheral side of the auxiliary pole 1b is reduced in width as compared to the other portion of the magnetic pole.

An effect similar to the structure of FIG. 2 is also obtained in such a structure.

As described above, according to the embodiment, the shape of a slot of an armature of a synchronous motor including a permanent magnet is made asymmetric. Accordingly, the winding fill factor can be increased. In addition, a provided cast resin can achieve a reduction in the temperature of the winding. Furthermore, the shape of the distal end portion on the inner peripheral side of the magnetic pole is made asymmetric. Accordingly, it is possible to increase the torque and reduce the cogging torque.

The above embodiments are not limited to the illustrated configurations and the like. The configurations can be modified as appropriate within the scope that can exert the effects of the embodiments. In addition, an embodiment where the configuration that is modified as appropriate without departing from the scope of the object of the embodiments is applied is also possible.

Moreover, each constituent element of the embodiments can be freely selected. An embodiment including the selected configuration is also included in the embodiments.

The present disclosure can be used for an armature structure of a synchronous motor.

The armature structure of the three-phase motor according to the embodiments of the present disclosure may be the following first to third armature structures of a three-phase motor:

The first armature structure of a three-phase motor is an armature structure of a three-phase motor where, in the three-phase motor having 6N (N is a natural number) slots of a motor armature, and 3N coils per phase, 3N main poles into each of which a winding bobbin around which the coil is wound is inserted, and 3N auxiliary poles around each of which the coil is not wound are alternately placed, in which the winding bobbin includes a barrel portion in contact with a side surface in a circumferential direction of the main pole in the slot, and a flange portion on an outer peripheral side rising in the slot from the barrel portion along a first outer peripheral bottom portion of the slot, and a gap area that is not occupied by the coil is provided in the slot, defined by a side surface in the circumferential direction of the auxiliary pole, an outer peripheral surface of the coil wound around the winding bobbin, and a second outer peripheral bottom portion of the slot, the second outer peripheral bottom portion being continuous to the first outer peripheral bottom portion and extending in a direction intersecting the first outer peripheral bottom portion.

The second armature structure of the three-phase motor is the first armature structure of the three-phase motor, in which end portions on the inner peripheral side of the main pole and the auxiliary pole in at least a core sheet located at an end portion in an axial direction include a coupling portion.

The third armature structure of the three-phase motor is the first or second armature structure of the three-phase motor, in which lengths of arcs of magnetic pole distal end portions located on inner peripheral surfaces of the main pole and the auxiliary pole are formed into shapes forming parts of an arc of a concentric circle with a circumferential length at a predetermined ratio to a circumferential length of an outer circle of an iron core, the distal end portion of one of the main pole and the auxiliary pole includes a flange-shaped portion extending to both sides on the circumference, and the length of the arc of the distal end portion of the other of the main pole and the auxiliary pole is formed as a tapered portion that tapers to one end where the length of the arc is less than a width in the circumferential direction of a portion other than the distal end portion of the other of the main pole and the auxiliary pole. In accordance with the length of the arc of the flange-shaped portion of the one of the main pole and the auxiliary pole.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. An armature structure of a three-phase motor, comprising:
   6N (N is a natural number) slots;
   1N coils per phase;
   3N main poles; and
   3N auxiliary poles, wherein
   a coil wound around a winding bobbin inserted into the slot is wound around the main pole,
   the coil is not wound around the auxiliary pole,
   the main poles and the auxiliary poles are alternately placed,
   the winding bobbin includes a barrel portion and a flange portion,
   the barrel portion is in contact with a side surface in a circumferential direction of the main pole in the slot,
   the flange portion rises in the slot from the barrel portion along a first outer peripheral bottom portion of the slot,
   a side surface in the circumferential direction of the auxiliary pole, an outer peripheral surface of the coil, and a second outer peripheral bottom portion of the slot define a gap area that is not occupied by the coil, in the slot,
   the second outer peripheral bottom portion is continuous to the first outer peripheral bottom portion, and extends in a direction intersecting the first outer peripheral bottom portion, and
   the gap area has a triangular cross-section shape, taken perpendicular to a rotation axis of the armature structure, that narrows in width towards the rotation axis.

2. The armature structure of the three-phase motor according to claim 1, wherein coupling portions are provided to magnetic pole distal end portions located on inner peripheral surfaces of the main pole and the auxiliary pole included in at least a core sheet located at an end portion in an axial direction among core sheets including the main poles and the auxiliary poles.

3. An armature structure of a three-phase motor, comprising:
   6N (N is a natural number) slots;
   1N coils per phase;
   3N main poles; and
   3N auxiliary poles, wherein
   a coil wound around a winding bobbin inserted into the slot is wound around the main pole,
   the coil is not wound around the auxiliary pole,
   the main poles and the auxiliary poles are alternately placed,
   the winding bobbin includes a barrel portion and a flange portion,
   the barrel portion is in contact with a side surface in a circumferential direction of the main pole in the slot,
   the flange portion rises in the slot from the barrel portion along a first outer peripheral bottom portion of the slot,
   a side surface in the circumferential direction of the auxiliary pole, an outer peripheral surface of the coil, and a second outer peripheral bottom portion of the slot define a gap area that is not occupied by the coil, in the slot,
   the second outer peripheral bottom portion is continuous to the first outer peripheral bottom portion, and extends in a direction intersecting the first outer peripheral bottom portion,
   lengths of arcs of magnetic pole distal end portions located on inner peripheral surfaces of the main pole and the auxiliary pole are formed into arc shapes forming parts of a circumference of a concentric circle with a circumferential length at a predetermined ratio to a circumferential length of an outer circle of an iron core,
   one of the main pole and the auxiliary pole includes, in the magnetic pole distal end portion, a flange-shaped portion extending to both sides on the circumference of the concentric circle, and
   the length of the arc of the magnetic pole distal end portion of the other of the main pole and the auxiliary pole is less than a width in the circumferential direction of a portion, other than the magnetic pole distal end portion, of the other of the main pole and the auxiliary pole, in accordance with a length of an arc of the flange-shaped portion.

4. An armature structure of a three-phase motor, comprising:
   6N (N is a natural number) slots;
   1N coils per phase;
   3N main poles; and
   3N auxiliary poles, wherein
   a coil wound around a winding bobbin inserted into the slot is wound around the main pole,
   the coil is not wound around the auxiliary pole,
   the main poles and the auxiliary poles are alternately placed,
   the winding bobbin includes a barrel portion and a flange portion,
   the barrel portion is in contact with a side surface in a circumferential direction of the main pole in the slot,
   the flange portion rises in the slot from the barrel portion along a first outer peripheral bottom portion of the slot,
   a side surface in the circumferential direction of the auxiliary pole, an outer peripheral surface of the coil, and a second outer peripheral bottom portion of the slot define a gap area that is not occupied by the coil, in the slot,
   the second outer peripheral bottom portion is continuous to the first outer peripheral bottom portion, and extends in a direction intersecting the first outer peripheral bottom portion,
   coupling portions are provided to magnetic pole distal end portions located on inner peripheral surfaces of the main pole and the auxiliary pole included in at least a core sheet located at an end portion in an axial direction among core sheets including the main poles and the auxiliary poles,
   lengths of arcs of the magnetic pole distal end portions located on the inner peripheral surfaces of the main pole and the auxiliary pole are formed into arc shapes forming parts of a circumference of a concentric circle with a circumferential length at a predetermined ratio to a circumferential length of an outer circle of an iron core,
   one of the main pole and the auxiliary pole includes, in the magnetic pole distal end portion, a flange-shaped portion extending to both sides on the circumference of the concentric circle, and
   the length of the arc of the magnetic pole distal end portion of the other of the main pole and the auxiliary pole is less than a width in the circumferential direction of a portion, other than the magnetic pole distal end portion, of the other of the main pole and the auxiliary pole, in accordance with a length of an arc of the flange-shaped portion.

* * * * *